Feb. 24, 1953 D. H. RANK 2,629,256
OPTICAL TORQUE MEASURING SYSTEM
Filed March 2, 1950

INVENTOR.
David H. Rank
BY
ATTORNEYS.

Patented Feb. 24, 1953

2,629,256

UNITED STATES PATENT OFFICE 2,629,256

OPTICAL TORQUE MEASURING SYSTEM

David H. Rank, State College, Pa., assignor to De Laval Steam Turbine Company, Trenton, N. J., a corporation of New Jersey Application March 2, 1950, Serial No. 147,286

6 Claims. (Cl. 73—136)

This invention relates to optical apparatus for torque measurement.

Power delivered through a rotating shaft may be determined by measuring the torque in the shaft and the rotary speed thereof. Accordingly, various devices, including optical ones, have been suggested for the measurement of shaft torque by the measurement of the relative angular deflection of two axially spaced portions of the shaft. If the deflection of the shaft under given load is known when the shaft is stationary, it will be evident that such devices, if capable of giving rise to measurements while the shaft is rotating, will give the necessary data for the determination of the torque and, when the speed of the shaft is taken into account, of the power transmitted thereby.

Optical devices and others proposed for this purpose have generally been unsatisfactory for various reasons. Some of them have required that a considerable length of shaft be available in order that there may be secured some minimum relative angular displacement of the spaced portions of the shaft to make measurements possible. Furthermore, such devices have generally required either the shaft construction to be of special type or have required major changes to be made in the shaft for the purpose of supporting the apparatus carried thereby. Furthermore, many of such devices require heavy and complex mechanism to be carried by the shaft so that they are inapplicable to torque measurement of shafts operating at extremely high speeds such as those of steam or gas turbines because of strength and balancing considerations.

One object of the present invention is to provide a torque measuring apparatus which requires the use of only a very short length of shaft, for example, only a few inches even of a large shaft capable of transmitting large torques. A further object of the invention is to provide an apparatus which requires a minimum of change of the shaft and the association with the shaft of a minimum of apparatus. As will presently appear the invention requires only securing to the shaft a pair of small and light mirrors.

By reason of what has been just mentioned the invention is made applicable to shafts, such as turbine shafts, operating at extremely high rotation speeds.

A further object of the invention is to provide apparatus for torque measurement which is extremely sensitive so that a very slight angular displacement of the two parts of the shaft carrying the mirrors is necessary for the attainment of accurate measurements. Accordingly, the invention is applicable to the measurement of relatively small torques in large shafts capable of transmitting very high torques.

The foregoing and other objects of the invention particularly relating to details of construction will become apparent from the following description read in conjunction with the accompanying drawing in which.

Figure 1:
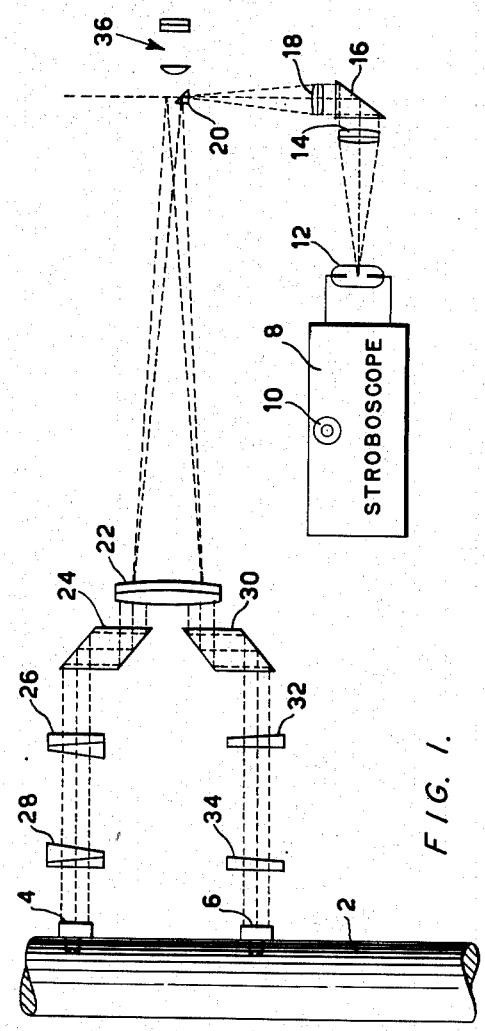
Figure 1 is a diagrammatic plan view of one embodiment of the invention.

Referring first to Figure 1, there is illustrated therein a shaft 2 transmitting torque which is to be measured. This shaft carries a pair of mirrors 4 and 6 which may be threaded into tapped holes in the shaft or may be otherwise secured therein. In view of the fact that the mirrors may be very light it will be evident that only very small holes or very simple attaching means need be provided so that there is no appreciable change in the shaft from the standpoint of its ability to transmit power. In the diagram for clarity of showing the mirrors may be regarded as very greatly enlarged since, in fact, they may be of diameters of only a small fraction of an inch. In general, in view of the sensitivity of the apparatus the mirrors need only be spaced by a matter of a few inches at most under most circumstances. Accordingly, measurements may be made using only a short available and accessible length of shaft.

At 8 there is illustrated a conventional stroboscope the frequency of flashing of which may be adjusted through the desired range through the use of one or more controls illustrated diagrammatically at 10. The gas or vapor discharge lamp flashed by the stroboscope is indicated at 12. These parts may be entirely conventional and all that is required is that the stroboscope should provide a flashing frequency which is desirably at least the frequency of rotation of the shaft. The frequency may, of course be a multiple of the frequency of rotation and in some cases, though generally with some loss of illumination, the frequency of the stroboscope may even be some submultiple of the frequency of rotation. Desirably the stroboscope should be capable of calibration in terms of frequency of flashing since under such circumstances by taking the calibration into account the speed of the shaft, as well as the deflections involved therein, may be measured and consequently there may be obtained through the same apparatus all of the data necessary for determining transmitted power.

The illumination from the lamp 12 is, in Figure 1, directed by the condensing lenses 14 and 18 and by the prism 16 to a small right angle prism 20, to be directed thereby toward the shaft. As will be evident hereafter the prism 20 provides, in effect, the actual source of illumination which is used, and the means for directing light thereto is purely a matter of convenience determined by the desired placement of the stroboscope source. In fact, the effective source of illumination in Figure 1 will be the left hand rectangular base of the prism 20.

The rays from the prism 20 pass to the objective lens 22 which collimates these rays to provide parallel rays. The parallel rays emerging from the objective lens 22 are split by a pair of prisms 24 and 30 so as to provide two pencils of rays. One of these, directed by prism 24, passes through a pair of wedges 26 and 28 and thence to the mirror 4 which reflects the rays backwards through the wedges 28 and 26, the prism 24 and the objective lens 22 to bring them to a focus in the vicinity of the prism 20 but displaced laterally slightly therefrom, i. e., upwardly as viewed in Figure 1. The viewing of the image thus produced is effected through the eye piece 36. It will be evident that the system amounts to a telescope for the viewing of the left hand face of the prism 20.

The second pencil of rays diverted by the prism 30 passes through a pair of wedges 32 and 34 to a mirror 6 whereby it is reflected back through the wedges 34 and 32 and directed by the prism 30 through the objective 22 to form also adjacent to the prism 20 a second image which is also viewed by the eye piece 36. This second image is desirably displaced laterally of the image formed by virtue of the first pencil of rays.

Figure 3:
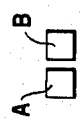
Figure 3 is a diagram showing the appearance of a pair of light areas as viewed by an observer when there is no torque transmitted by the shaft or when adjustments have been made for measurement of a torque.

The wedges 32 and 34 are rotatable about their optical axes and are provided for preliminary adjustment. Once adjusted they need not be thereafter changed. One of the adjustments afforded by these wedges is to move one of the images to the side of the other to provide a pair of images such as indicated in Figure 3 in which one image is indicated at A and the other image is indicated at B.

The wedge 28 is the measuring wedge and is adapted to be rotated about an axis parallel to the pencil of rays passing therethrough. A fine adjustment of conventional optical type may be provided in connection with this wedge and may carry suitable graduations so that the angular position of this wedge may be accurately determined. The wedge 26, on the other hand, is stationary and forms one of a set for a purpose which will be made clear hereafter.

For the measurement of torque initial adjustments may be made with the shaft stationary and in position so that both mirrors will provide images which may be viewed through the eye piece. With the rotating wedge 28 in its zero position, and with the stationary wedge 26 removed, adjustments of the wedges 32 and 34 are made to produce, as viewed in the eye piece, a pair of images of the prism face corresponding in position to the images A and B as they appear in Figure 3.

Figure 4:
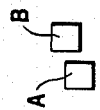
Figure 4 is a view similar to Figure 3 but showing the light areas as they appear prior to a measuring adjustment.

If now the shaft 2 is operated at its proper speed and is transmitting torque and the stroboscope is adjusted to flash in synchronism with the shaft or at a frequency which is a multiple or submultiple of the frequency of rotation of the shaft, stationary images will be produced as viewed through the eye piece but, in general, due to the torque these images will be displaced from each other as illustrated in Figure 4. The wedge 28 will now be rotated to produce a relative deflection of one of the images with respect to the other until they are brought back to the condition illustrated in Figure 3. If, preliminarily, the wedge 28 has been calibrated its displacement from zero position will give a direct measure of the relative angular displacement about the shaft of one of the mirrors with respect to the other. From this the torque in the shaft may be easily calculated, given the axial displacement of the two mirrors from each other and the nature of the material and diameter of the shaft.

In an apparatus of high sensitivity, the rotation of wedge 28 through 180° may correspond to only a relatively slight twist of the shaft between the mirrors: for example, a twist of only twenty minutes. In order to extend the range of the apparatus it is accordingly necessary to associate with the wedge 28 a series of additional wedges 26 which may be provided so as to deviate the pencils of rays through increments of the total deviation produced by wedge 28 and multiples thereof. For example, if the total deviation produced by wedge 28 corresponds to twenty minutes, the additional wedges 26 may be provided to produce deviations of twenty minutes, forty minutes, sixty minutes, etc., respectively. Accordingly it is possible to use the apparatus to provide uniform sensitivity throughout a large range of angular deviations of the mirrors from each other.

The stroboscope is required to cause the images to be stationary at some particular phase of the rotation of the shaft, so that adjustments may be made to bring the images from a condition such as indicated in Figure 4 to the condition indicated in Figure 3. It may be noted that generally it is not essential to lock the stroboscope in synchronism with the shaft since if only approximate synchronism is achieved by continuous manual adjustment of the stroboscope frequency the images will merely drift in one direction or the other as a unit without displacement relative to each other. The side-by-side arrangement of the images indicated in Figure 3 may be very accurately determined irrespective of whether there is or is not some slow drift of the images together.

Figure 2:
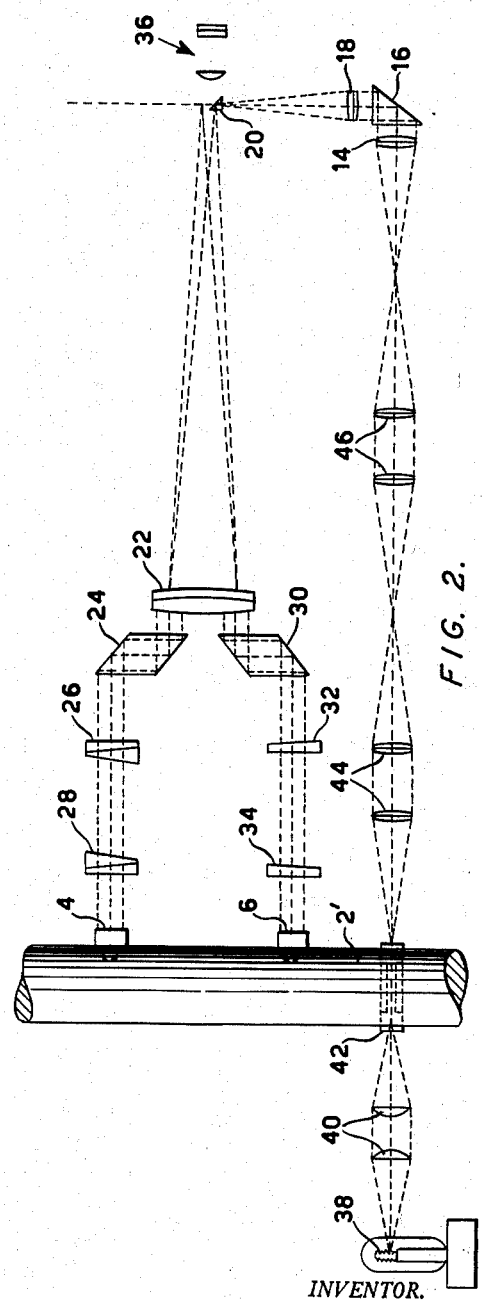
Figure 2 is a similar diagrammatic plan view of another embodiment of the invention.

The use of a stroboscope such as indicated at 8 may be avoided in case it is permissible to provide some additional modification of the shaft. An alternative arrangement is illustrated in Figure 2 in conjunction with a shaft 2'. To the extent that the apparatus is identical with that illustrated in Figure 1, corresponding reference numerals are used to designate the parts. To secure stroboscopic action, however, there is provided a continuously illuminated lamp 38 which, through condensing lenses 40, provides illumination to a cylindrical plug 42 of light-transmitting material, for example, a highly refractive plastic such as Lucite inserted in an opening extending diametrically across the shaft. By polishing the cylindrical surface of such a plastic plug all of the light entering the plug will be caused to pass therethrough, thus avoiding loss of intensity. The emerging light is directed by transfer lens systems 44 and 46 to the type of optical system previously described.

It will be evident that this arrangement provides a stroboscopic effect which is always synchronized with the shaft. Actually the light passes through the plug twice in each revolution but only one passage is utilized, this corresponding to the location of the mirrors 4 and 6 on the observed side of the shaft.

It will be evident that other stroboscopic arrangements may be used to chop the light to secure effectively stationary images, such as rotary shutters, or the like.

While reference has been particularly made to visual observation of the images produced by reflection from the mirrors as at A and B, it will be evident that the observation of these images may be effected by photoelectric means with electrical indication of final adjustment, or more elaborately, involving automatic wedge adjustment to the measuring position.

Various possible alternatives for embodiment of the invention will be evident from the foregoing. As has been stated in connection with the description of Figure 1, the face of the prism 20 forms, in effect, the stroboscopically illuminated object observed. It will be evident that this may be replaced by a stroboscopically illuminated aperture or body which, if desired, may be located at an angular position about the shaft substantially different from the eye. Furthermore, while lens 22 is used in a dual capacity in the apparatus illustrated, this need not be the case and if a source is located as last mentioned proper paths of light rays may be secured for observation by a single telescope through the use of suitably placed mirrors or prisms in many evident fashions. There is, of course, no necessity for having the source effectively at infinity in an optical sense.

It will likewise be evident that light occulted by the shaft, as by passing through an aperture such as 42, may be suitably directed by mirrors or prisms to the mirrors 4 and 6, taking thereto a path angularly spaced about the shaft from the plane of the viewing devices.

Accordingly, it is to be understood that the invention is not to be regarded as limited except as required by the following claims.

What is claimed is:

1. Apparatus for torque measurement comprising a pair of mirrors adapted to be secured in axially spaced positions on a shaft and to sweep rays reflected therefrom about the shaft, means providing a source of illumination, means splitting light from said source into a pair of beams, directing said beams individually to the mirrors, and providing, after reflection from said mirrors, a pair of images of said source lying adjacent to each other, means causing said images to exist momentarily in synchronism with rotation of the shaft, and means in the path of one of said beams for deflecting the image produced therefrom.

2. Apparatus for torque measurement comprising a pair of mirrors adapted to be secured in axially spaced positions on a shaft and to sweep rays reflected therefrom about the shaft, means providing a source of illumination, means splitting light from said source into a pair of beams, directing said beams individually to the mirrors, and providing, after reflection from said mirrors, a pair of images of said source lying adjacent to each other, means, comprising a stroboscope, causing said images to exist momentarily in synchronism with rotation of the shaft, and means in the path of one of said beams for deflecting the image produced therefrom.

3. Apparatus for torque measurement comprising a pair of mirrors adapted to be secured in axially spaced positions on a shaft and to sweep rays reflected therefrom about the shaft, means providing a source of illumination, means splitting light from said source into a pair of beams, directing said beams individually to the mirrors, and providing, after reflection from said mirrors, a pair of images of said source lying adjacent to each other, means, comprising a light-transmitting passage through the shaft, causing said images to exist momentarily in synchronism with rotation of the shaft, and means in the path of one of said beams for deflecting the image produced therefrom.

4. Apparatus for torque measurements comprising a pair of mirrors adapted to be secured in axially spaced positions on a shaft and to sweep rays reflected therefrom about the shaft, means providing a source of illumination, means splitting light from said source into a pair of beams, directing said beams individually to the mirrors, and providing, after reflection from said mirrors, a pair of images of said source lying adjacent to each other, means causing said images to exist momentarily in synchronism with rotation of the shaft, and means comprising a prism in the path of one of said beams for deflecting the image produced therefrom.

5. Apparatus for torque measurement comprising a pair of mirrors adapted to be secured in axially spaced positions on a shaft and to sweep rays reflected therefrom about the shaft, means providing a source of illumination, means splitting light from said source into a pair of beams, directing said beams individually to the mirrors, and providing, after reflection from said mirrors, a pair of images of said source lying adjacent to each other, means causing said images to exist momentarily in synchronism with rotation of the shaft, and means comprising an adjustable prism in the path of one of said beams for deflecting the image produced therefrom.

6. Apparatus for torque measurement comprising a pair of mirrors adapted to be secured in axially spaced positions on a shaft and to sweep rays reflected therefrom about the shaft, means providing an intermittent source of illumination synchronized with rotation of said shaft, means splitting light from said source into a pair of beams, directing said beams individually to the mirrors, and providing, after reflection from said mirrors, a pair of images of said source lying adjacent to each other, and means in the path of one of said beams for deflecting the image produced therefrom.

DAVID H. RANK.

REFERENCES CITED

The following references are of record in the file of this patent:

UNITED STATES PATENTS

| Number | Name | Date |
| --- | --- | --- |
| 2,086,391 | Poole | July 6, 1937 |
| 2,176,935 | Smith | Oct. 24, 1939 |
| 2,402,719 | Allison | June 25, 1946 |
| 2,586,540 | Holden | Feb. 19, 1952 |

FOREIGN PATENTS

| Number | Country | Date |
| --- | --- | --- |
| 417,051 | Great Britain | Sept. 21, 1934 |